Figure 1:
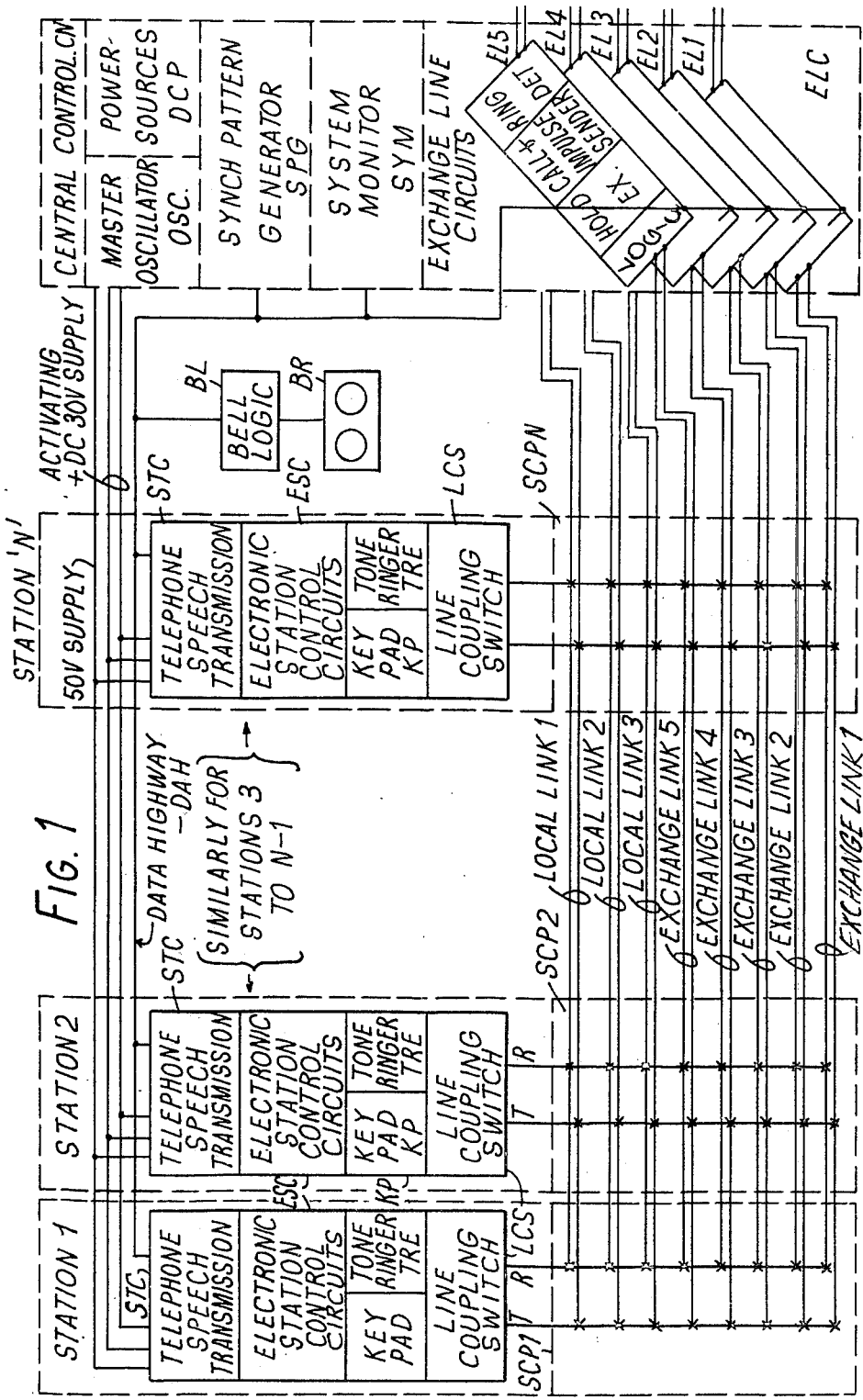

United States Patent [19]

Williams

[11] 4,136,263
[45] Jan. 23, 1979

[54] TELEPHONE SYSTEM HAVING SPACE DIVIDED SPEECH CHANNELS AND A SEPARATE TIME DIVIDED DATA HIGHWAY

[75] Inventor: Ioan H. Williams, London, England

[73] Assignee: Thorn-Ericsson Telecommunications (Mfg.) Limited, London, England

[21] Appl. No.: 809,422

[22] Filed: Jun. 23, 1977

Related U.S. Application Data

[63] Continuation of Ser. No. 733,391, Oct. 18, 1976, abandoned, which is a continuation of Ser. No. 566,676, Apr. 8, 1975, abandoned, which is a continuation of Ser. No. 404,656, Oct. 9, 1973, abandoned.

[30] Foreign Application Priority Data

Oct. 2, 1972 [GB] United Kingdom ............... 47160/72

[51] Int. Cl.$^2$ .............................................. H04J 3/12
[52] U.S. Cl. .......................... 179/15 AT; 179/15 BY; 179/18 AD
[58] Field of Search .................. 179/18 J, 18 AD, 99, 179/15 AL, 15 BY, 15 AT, 18 FC, 37–40

[56] References Cited

U.S. PATENT DOCUMENTS

| | | | |
|---|---|---|---|
| 1,563,652 | 12/1925 | Powell | 179/18 AD |
| 3,519,757 | 7/1970 | Anderson et al. | 179/18 J |
| 3,643,030 | 2/1972 | Sparrendahl | 179/15 BA |
| 3,728,492 | 4/1973 | Cappetti et al. | 179/18 FC |
| 3,749,848 | 7/1973 | Knollman et al. | 179/99 |
| 3,781,478 | 12/1973 | Blahut et al. | 179/15 AL |
| 3,843,845 | 10/1974 | Ridley | 179/99 |

Primary Examiner—Thomas W. Brown
Attorney, Agent, or Firm—Robert F. O'Connell

[57] ABSTRACT

A telephone intercommunications system has speech channels to which the telephone stations of the system can be selectively linked, a plurality of data channels in time-division multiplex to which the telephone stations can be linked for the transmission of data therebetween, common data synchronizing means, and for each telephone station (1) electronic means for generating a cyclically-recurring frame of data channels, (2) electronic means for writing data into a data channel, (3) electronic means for reading data in each data channel, (4) electronic means for recognizing data appertaining to the channel, (5) electronic means for causing the station to be linked to a speech channel identified by a data channel.

13 Claims, 3 Drawing Figures

TELEPHONE SYSTEM HAVING SPACE DIVIDED SPEECH CHANNELS AND A SEPARATE TIME DIVIDED DATA HIGHWAY

This is a continuation of application Ser. No. 733,391, filed Oct. 18, 1976 which is a continuation of Ser. No. 566,676, filed Apr. 8, 1975, in turn a continuation of Ser. No. 404,656, filed Oct. 9, 1973 now abandoned.

The present invention relates to telephone systems, and more particularly to telephone intercommunications systems.

Telephone intercommunications systems have evolved to provide telephonic intercommunication between subscribers forming a relatively small community or group. Such systems may be of the so-called "House" type, i.e. which provide only for intercommunication between the telephones of the system, or they may take the form of private branch systems by also providing at least some of the subscribers with access over one or more external lines to the public exchange network and/or to other private branch exchange (PBX) systems. It is a feature of some intercommunications systems that the control apparatus required for the functioning of the system is distributed over the telephone stations of the system so that the amount of common control equipment required is reduced to a minimum. Thus, the initial cost of such systems can often be related to the number of telephone stations provided.

However, with known systems, the arrangement has tended to be somewhat inflexible as regards the extent and variety of facilities, such as conference facilities on internal calls, call transfer from external exchange line calls, and the like which can be provided economically.

The object of the present invention is to provide improved arrangements for telephone intercommunications systems of the kinds outlined above whereby a substantial range of different facilities may be provided in a simple and economical manner.

According to the present invention there is provided a telephone intercommunications system comprising a first number of service terminal points at least some of which are constituted by the telephone stations of the system, a second number (which can be less than the first number) of speech channels to which the telephone stations of the system can be selectively linked by switch means individual to each telephone station, a plurality of data channels in time-division multiplex to which the various service terminal points can be linked and over which data can be passed in time-division multiplex between the service terminal points of the system, a common data synchronising means, and, in association with each telephone instrument, electronic means for generating a cyclically recurring frame of data time channels under the control of the common synchronising means, electronic means for writing data appertaining to a call in at least one selected data time channel, electronic means for reading data during each of the data time channels, electronic means for recognising a data pattern relevant to the station, and electronic means for causing the switch means associated with the station to be set to link the station to a speech channel identified by the recognised data.

The speech channels of the system are preferably constituted by respective separate line wire pairs. Conveniently, with this embodiment, the switch means associated with each telephone of the system is constituted by the contacts of a group of multi-contact miniature type relays, since this type of switch is settable to any outlet position in direct response to a signal code applied to the switch in parallel form over a number of signalling wires extended from the electronic means.

It is further preferred that the data channels have at least one data time channel for each speech channel of the system. The identity of each speech channel is then given by the time-position of the data channel in the frame.

Preferably also, all the electronic means associated with each telephone instrument is constituted by a single integrated circuit element formed as a unit separate from the telephone instrument, but connectable to appropriate terminals within the instrument over connecting leads extended from the integrated circuit element and the present invention is to be taken to include such as integrated circuit element.

Thus a telephone station for the system of this preferred embodiment may be considered as forming three substantially separate parts, to wit, a telephone instrument, preferably of the type employing a tone sounder or equivalent in place of the usual telephone bell, a suitable switch means, and an electronic integrated circuit logic means. The three parts may be located separate from one another or they may be located together within the telephone instrument casing, depending upon the number of speech channels provided, manufacturing convenience, etc. Alternatively, the electronic means may be located within the telephone instrument casing, the switch means being located within a separate switch box unit. With this latter arrangement, a switch box unit may house the several switch means respectively associated with each of a group of telephone stations, so that a system according to the present invention may be arranged to suit a number of different installation configurations. For example, where the electronic logic means and the switch means are located together with the associated telephone instrument, the wires providing speech channels, data highway, power supply, etc. may be looped serially from station to station of the system. Alternatively, where the switch means associated with respective ones of a group of telephone stations are separately located within a switch box unit common to the group, this may serve as a distribution point to which the respective telephone stations with their associated electronic means may be connected in star formation and where a number of such star connected groups are formed, the wires forming the speech channels, data highway, etc. may be looped serially, from central control equipment, over the several switch box units, or connected from the central control equipment to the switch bos units in star formation.

Preferably, the central control equipment comprises a unit which houses at least the means for generating the data channel synchronising signals. In the case of a "House" type intercommunications installation, the service terminal points of the system would all be constituted by telephone, or equivalent, stations, while in the case of a Private Branch type installation, some of the service terminal points would be constituted by exchange line terminating circuits or the like, and these would preferably also be accommodated within the central control unit.

In the preferred arrangement according to the invention, each of the time multiplexed data channels is time-subdivided to provide a number of data bit time slots within each channel period. One group of these time slots is reserved for the transmission of binary codes representing digital address data. The remaining time slots are reserved for the transmission of signal and control data and in operation of this preferred arrangement, a data channel is taken into use for a call, and to enable each station involved in a call to recognise the data channel appertaining to itself, the control logic in each station incorporates means for recording its own numerical identity and also for recording the identity, with respect to the cycle of data channels, of the data channel taken into use for the call. Thus, by arranging the control logic in each station to count the data channels continuously as they occur in each cycle of data channels and also to read continuously the data words being presented to it from the data highway, the recognition of a relevant data channel may be effected either by detecting coincidence between the recorded station address and the address presented to it in a data channel, or by detecting the occurrence of the data channel taken into use for the call, the method of recognition adopted depending, initially, upon whether the station is calling or is being called. Once a station of the system has responded to a call by recognition of its own address identity, it will also register the identity of the data channel being used for the call and, since the speech channels of the system are respectively associated with the data channels, registration of a data channel identity also provides the information necessary for the setting of the station switch means to the speech channel to be used for the call.

Where the intercommunications system also provides access to one or more public exchange or PBX lines, these are terminated upon respective line circuits, and to each of them a speech channel of the system can be individually allocated. Thus for each exchange line there can be one channel of the time multiplexed data channels which is unique to that exchange line.

As stated above, in addition to the digital address data for which the address portion of a data time channel is reserved, control information appertaining to the busy/free condition of the corresponding speech channel, as well as the condition of the station equipment of the subscriber or subscribers involved in the call, are indicated by the presence or absence of a data bit in a respective one of the data channel time slots reserved for the transmission of control information. Thus, data channels allocated to exchange lines may be distinguished from those allocated to serve internal calls by reserving a control portion time slot in each data channel to carry a 'type of line' data bit so that absence of a data bit in this time slot indicates an internal line time channel, for example, while the presence of a data bit in that time slot indicates an exchange line time channel. Similarly, respective ones of the other control portion time slots may be allocated to carry other information, such as the called station busy hold, the called station ringing, the called station answer (off-hook), conditions, etc.

Discrimination as to the type of service required when a call is initiated, may be indicated by the dialling of a specified prefix digit, this being a digit not used as the first digit of an internal line digital address. Thus, a subscriber wishing to make an external line call would dial the prefix digit "9" for example, to cause his station control equipment to scan the time channels as they occur and to seize the first free exchange line time channel, i.e. one in which a control data bit is present in the type of line data time slot, while no data bit is present in the busy/hold time slot. If no free exchange line exists, this can be detected after one complete cycle of the data channels and an equipment busy signal applied to the caller's station. Similarly for an internal call, only the digits of the wanted station address would be dialled, and in this case the calling station control equipment would look for a free internal line data channel, i.e. in which no data bits are present in either the exchange or busy/hold time slots.

For the establishment of an external line call, the digits identifying the wanted subscriber may be transmitted between the calling station and the exchange line terminating circuit concerned, one digit at a time, during separate occurrences of the corresponding exchange line data channel, the digits being carried as binary code bit groups in appropriate ones of the data channel address time slots.

The above and other features of the invention will be described in more detail with reference to the attached diagrams, of which FIG. 1 is a diagram illustrating one arrangement of a private branch intercommunication system according to an embodiment of the invention.

Figure 2:
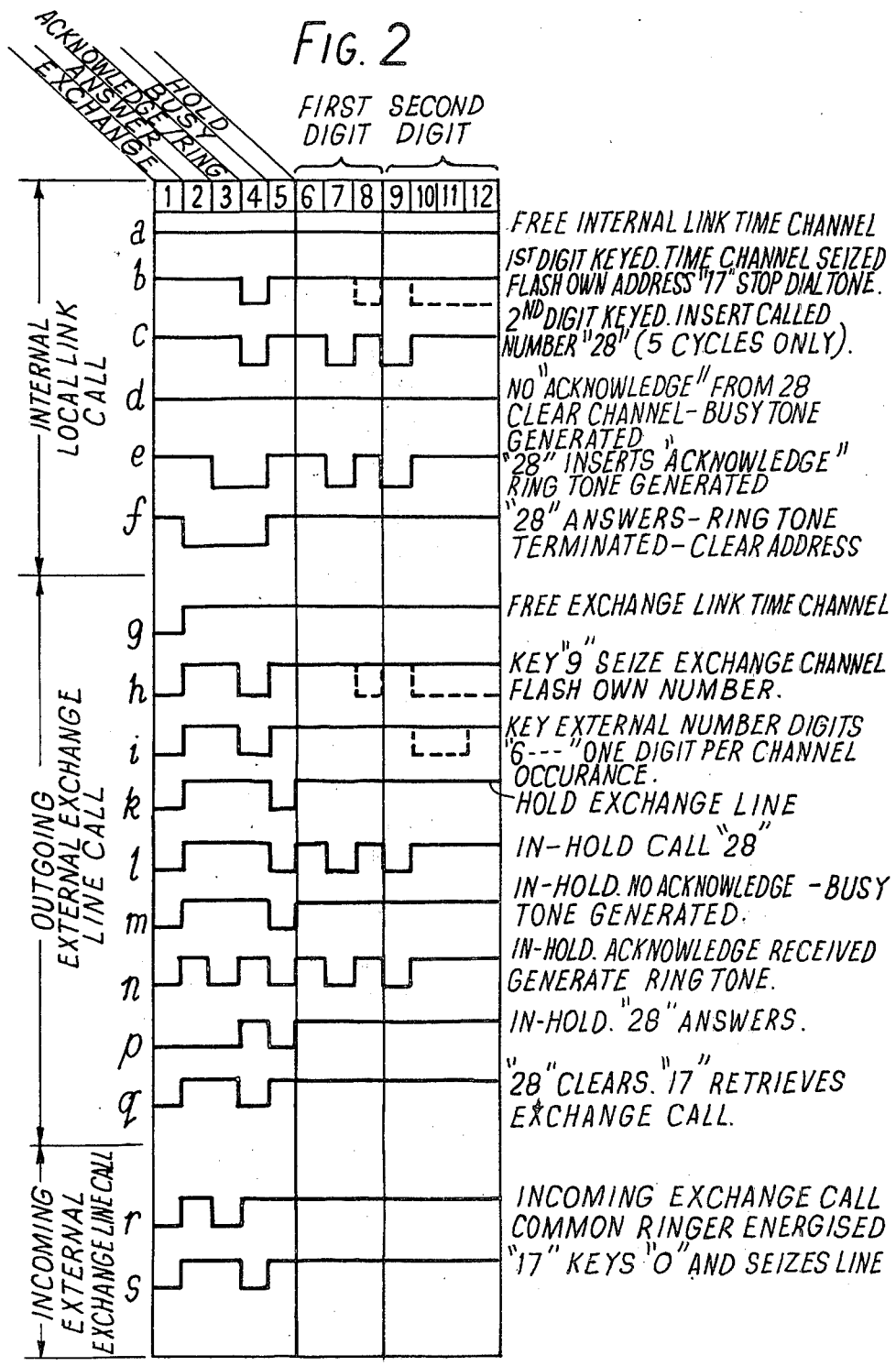
Figure 3:
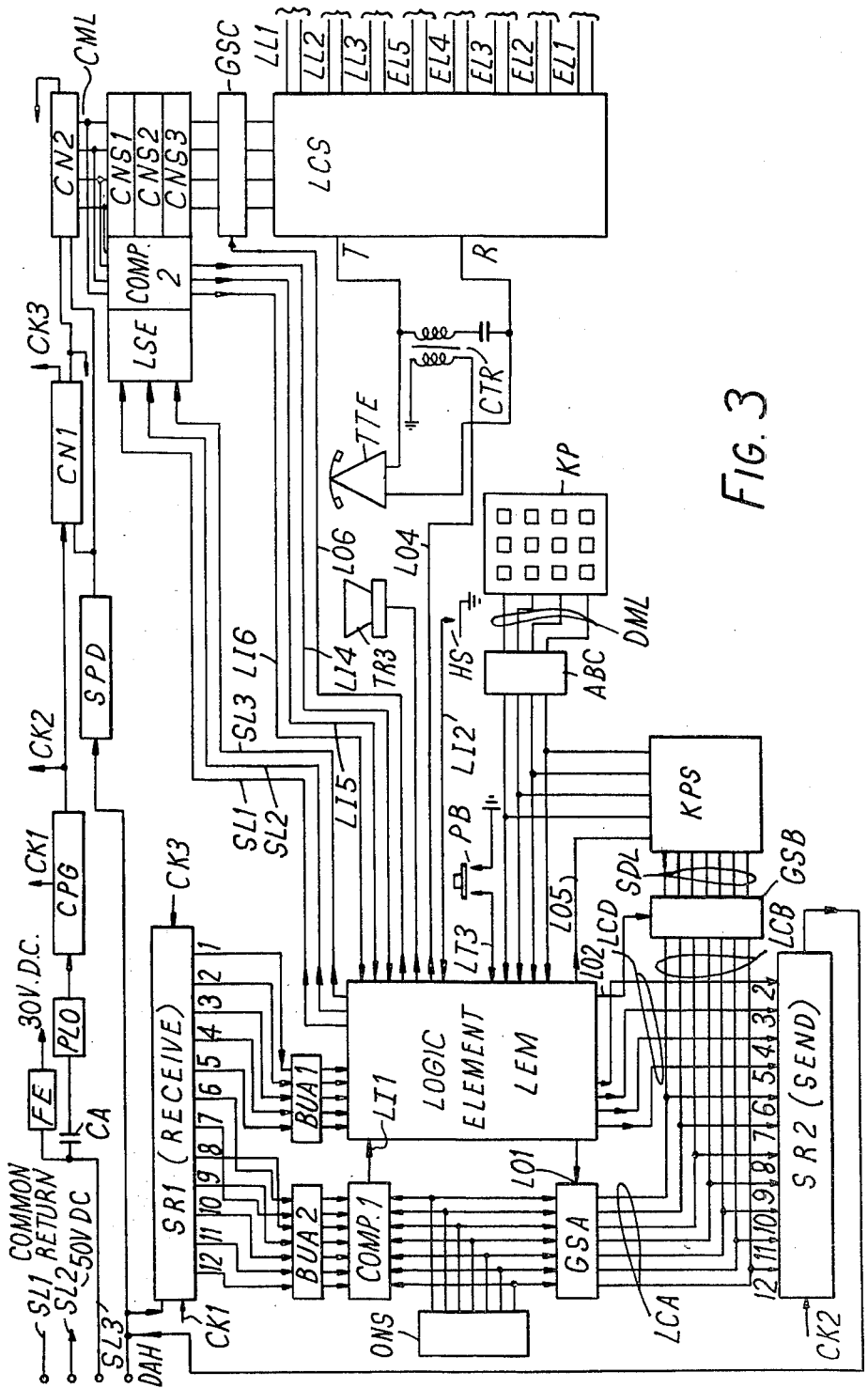

FIG. 2 illustrates one contemplated allocation of the time slots in a data channel of the system, while FIG. 3 illustrates in block schematic form the arrangement of a telephone station incorporating the associated electronic logic means as well as the associated switch means.

The intercommunications system illustrated generally by FIG. 1 of the drawings comprises a central control equipment CN, an incoming exchange call alarm bell BR, and an associated logic element BL, a number of telephone stations, designated station 1, station 2, . . . station N, and a multi-pair cable by means of which the telephone stations and the central control equipment and the bell BR are interconnected. The system illustrated is one in which the several stations of the system and the central control equipment are arranged, serially, with the multi-pair cable looped from station to station and to the central control equipment. It is to be understood, however, that other, star, formations of the telephone stations may be provided, thus at any point along its length the multi-pair cable may be branched and each branch may serve one or more stations of the system, without the need for any modification to the telephone station or central control equipments.

As will be appreciated from the further description, given below, the number of telephone stations that can be provided is determined only by the grade-of-service to be provided and by the scope of the numbering system employed for station selection. For convenience, a two decimal digit numbering system will be assumed giving a maximum of 100 different numbers. However, since the system requires the use of three first digits (i.e. digits 8, 9 and 0) for call discrimination purposes, the maximum number of telephone stations that can be provided, using two digit numbering, is limited to 70 stations.

The telephone stations themselves comprise telephone instruments, which may be of any known form, and which, in addition to the usual speech transmission circuits STC, are adapted to include within the telephone instrument casing, an electronic station control circuit indicated at ESC, FIG. 1. Preferably also the telephone instrument would be provided with a push-button dialling key-set, referred to herein as a keypad (KP) in place of the rotary dialling mechanism and a tone sounder TRE in place of the usual telephone bell. The telephone instruments would also each be provided with an additional push button switch (not shown) for use in signalling a line "hold" condition as described in more detail below. Also, each telephone instrument has an associated line coupling switch LCS which preferably comprises a group of miniature multi-contact relays whose contacts are arranged in well-known tree formation, indicated diagrammatically in FIG. 1, by the respective cross-point groups SCP1, SCP2 . . . . SCPN. As described in more detail below, these line coupling switches are selectively operable to switch the associated telephone station line wires T and R, to any one of a number of link wire pairs, included within the multipair cable and which extend between the respective telephone stations and the central control equipment CN.

For installations requiring a relatively small number of link wire pairs, for example up to eight pairs, then the relays forming the line coupling switch may also be located within their respective telephone instrument casings. For larger installations the relays forming the line coupling switch would be located separately from their respective telephone instruments, as also described in more detail below.

The system illustrated in FIG. 1 provides for eight link wire pairs, as shown. Three of these are indicated as servicing only for local calls between the stations of the system and are respectively designated, local link 1, local link 2 and local link 3. The remaining five link pairs serve exclusively for external exchange line calls, incoming or outgoing, and are respectively designated exchange link 1 to exchange link 5. It is to be appreciated, however, that this allocation of the link wire pairs is quite arbitrary and any allocation of the link wire pairs from all local, to all exchange, may be made without any alteration to the station control circuits being required. Also systems may be provided with fewer link wire pairs or with more link wire pairs according to the anticipated level of the telephone traffic. In addition to the link wire pairs, the telephone stations and the central control equipment CN are linked by a data highway DAH, which is preferably constituted by a further two-wire pair, to avoid cross-talk difficulties, and three supply lines, one of which provides a common earth return line, while the other two provide respectively a DC 50V supply for the line coupling switch relays and a DC 30V supply for the electronic station control elements, the latter supply also having superimposed thereon an A.C. supply of predetermined frequency which provides a datum time marking source to each of the telephone stations of the system.

A relay switching tree for connecting a telephone to one of sixteen link wire pairs may be accommodated within the housing of the telephone instrument itself.

The central control equipment CN provides a location for apparatus which is common to all the telephone stations of the system. Thus, it includes the 50V and 30V D.C. power sources DCP described above, a master oscillator OSC for generating the time marking frequency, and a synchronising pattern generator SPG, the output from the latter being connected to the data highway DAH and serving to maintain the stations in correct time division multiplex alignment, as described in more detail below. The central control equipment CN may also include what may be termed system monitor apparatus SYM. Generally, this apparatus is provided as required for particular facilities. For example, it may be required to record the durations of calls together with the identities of the stations involved, and the storage and timing apparatus necessary for this would be located within the system monitor part of the central control equipment. In addition, the system monitor could include a strapping terminal field whereby stations not initially equipped in an installation can have their numbers marked unobtainable. Unobtainable tone could also be generated by a telephone instrument after receiving no acknowledgment. Also, a class-of-service translation field may be provided where "executive" and like facilities are required. Finally, the central control equipment includes the exchange line circuits ELC, which form the interface between the exchange links, internally of the system and the external exchange lines of PBX exchange tie lines. These exchange line circuits are designed to form separate plug-in circuit cards, as indicated in FIG. 1, the external exchange lines and the corresponding internal exchange links being terminated upon the plug-socket members (not shown) associated with the respective exchange line circuit cards. As also explained in more detail below, the arrangement is such that insertion of an exchange line circuit card into a plug-socket in the exchange line circuit part of the central control equipment, causes the corresponding internal two wire links to serve only for exchange calls utilising that exchange line circuit and exchange line.

Similarly, removal of an exchange line circuit card restores the corresponding internal two wire link to serve internal calls within the system. As also indicated in FIG. 1, each exchange line circuit includes ring detector means for detecting incoming exchange line calls, calling and impulsing means for the establishment of outgoing exchange line calls, and exchange line hold means, for holding an exchange line call, for example, to enable an enquiry call to be made, and logic means for effecting appropriate data signalling over the data highway DAH.

The data highway DAH serves to present both control and address data to the control unit and to the telephone stations of the system, the data being multiplexed on a time division basis. In the proposed arrangement being described, the multiplex provides a cyclically recurring frame of 17 data time channels each of which is time-divided to provide 12 data bit time slots. Of the 17 data time channels, one is used to carry a synchronising pattern of data bits which is applied to the data highway in the 17th time channel period from the synchronising pattern generator SPG in the central control equipment. The remaining sixteen data channels correspond respectively to the speech pairs which link the equipment CN and the several telephone stations of the system. Thus the proposed arrangement provides for a maximum of 16 speech pairs. In the diagram of FIG. 1 only eight speech pairs are shown, and where fewer than the sixteen speech pairs are provided, or used, then the redundant data time channels would be permanently busied from the monitor element, as described in more detail below. It will be appreciated that, since the TDM data transmission functions in relation to the speech channels of the system and not in relation to the telephone stations themselves, the number of telephone stations that can be provided is in no way restricted by the data transmission system.

Further, the recurrence frequency of the data channels can be relatively low, of the order of 1000 channels per second, so that, within reasonable limits of line length, the system can be synchronised from the central control equipment without the need for any elaborate arrangements to compensate for transmission time delays in the data highway. Thus, the multi-pair cable may be installed in a building as a straight run from which the telephone stations are T'd off, either singly or in groups, and the central control equipment may be located at any suitable point in the cable network, taking into consideration the maximum permissible distance, about 2000 meters, between the central control equipment and the most distant telephone station. Further, the multi-pair cable may be terminated upon plug-sockets located where required along the cable run, and each telephone would then be provided with a jack-terminated cable end, which can be installed at any socket point along the multi-pair cable run. Again, every telephone has a unique digital address, which has no reference to the position of the telephone. Thus the locations of telephones can be changed without the need to make any system changes and the telephones still retain their original digital address. Also each telephone may be arranged to store its own address, and plug-in devices may be provided, for example in the form of a stud or card, which can be inserted from the exterior of the telephone case to set the store to record a particular address, so that the digital address of a telephone can be changed simply by changing the plug-in device.

FIG. 2 of the drawings shows the data bit waveforms that can occur in the twelve data bit time slots of a data channel during the establishment of local and exchange line calls. Referring to the diagram, the time slots are numbered 1-12 inclusive, in the order of their occurrence. Time slots 1-5 are reserved to carry control data bits, while the time slots 6-12 carry station address data bits. Each of the five control data bits has a specific significance, as follows:

Time Slot 1. Exchange Line mark. The presence of a data bit in this time slot of any channel indicates that the associated speech pair is allocated to an external exchange line via a line circuit card in the central control equipment, see FIG. 1. Th exchange line data bit is continuously maintained by the logic element of the line circuit. The presence of the exchange line mark bit prevents this time channel being taken into use for an internal call, but, as described in more detail below, this data channel and its associated speech pair are used on an internal enquiry call, when a hold condition has been applied to the associated external exchange line.

Time Slot 2. Answer bit. The occurrence of a data bit in this time slot of a data channel indicates that a called subscriber has removed the handset from his telephone instrument to answer a call. The occurrence of this data bit terminates all service tones at the calling station and also clears all address data from the address portion of the time channel.

Time Slot 3. Acknowledge/Ring. On internal calls, the occurrence of a data bit in this time slot indicates that a called station is free and is being rung. As described more fully below, when a station recognizes that it is being called, it actuates a tone sounder within the telephone instrument and at the same time inserts the acknowledge bit in this time slot of the data channel. Detection of the acknowledge bit at the calling station brings about the generation of ring tone thereat. Also, where a common ringer is provided to indicate incoming exchange line calls, the occurrence of a data bit in this time slot of the associated exchange line, time channel actuates the common ringer, the system being arranged so that any station can answer the incoming call by keying the discriminating digit "0."

Time Slot 4. Channel busy. When a station handset is removed to initiate a call, dial tone is generated within the telephone station. Depending upon the value of the first digit keyed, discrimination is effected by the station control apparatus as to whether an internal or external line is required. The first appropriate free time channel is seized and marked busy by the insertion of a data bit in this time slot.

Time Slot 5. Exchange Line Hold. Each telephone station is provided with a hold push button switch so that a telephone station engaged on an external exchange line call can cause a hold condition to be applied to the exchange line from the associated exchange line circuit. Thus, actuation of the hold button brings about the insertion of a data bit in this time slot and detection of this data bit by the associated line circuit logic brings about the operation of a hold relay within the line circuit, which disconnects the through speech path and applies a hold condition to the exchange line. As explained in more detail below, the system is arranged so that a subsequent depression of the hold button, and a consequent subsequent appearance of a data bit in this time slot brings about a retrieval of the exchange line.

As described above, the address data bits are located within the time slots 6-12 inclusive. These are divided into two groups of three and four bits respectively. The three bits occurring in time slots 6, 7 and 8 are coded to represent the first digit of an internal station address, only three bits are required since, as previously mentioned, digits "0," "8" and "9" are reserved as discriminating digits and hence cannot be used as first station address digits. The remaining four bits which occur in time slots 9, 10, 11 and 12 respectively, are coded to represent the second station address digit.

Thus the two digits of a station address appear together in successive occurrences of the respective time channel. In the case of an external exchange line number, the time slots 9-12 inclusive serve for signalling the external number, one digit at a time in successive occurrences of the respective data time channel, the digits being registered within the exchange line unit and repeated as impulse trains, MF signals or as required by the exchange to which the exchange line is connected.

The waveforms shown in FIG. 2 illustrate the manner in which data is presented to the station control apparatus of stations involved in a call. Waveforms (a)-(f) are those which occur on an internal call while waveforms (g)-(s) are those which occur on an external call.

Considering the waveforms established in a time channel of the TDM system, taken into use for an internal call. For the sake of example, we will assume that station No. 17 is calling station No. 28. In the manner described more fully below, removal of the handset at station 17 initiates the generation of dial tone thereat and the caller keys the first digit of the wanted number. The station 17 control apparatus registers the keyed digit and from it discriminates that an internal call is required. The station 17 control apparatus now scans the TDM time channels as they occur and seizes the first free internal line time channel, that is, one in which no data bits are present in either of the time slots 1 or 4. (Waveform (a)). If after one complete frame of time channels has been scanned no free internal line time channel is detected, then the station 17 control apparatus will generate an equipment engaged tone to inform the caller that no free internal line link is available. Assuming however that a free internal line time channel is detected then, as shown in waveform (b), this is seized for the call and a channel busy bit is inserted in time slot 4, in this and all subsequent occurrences of this time channel while the call is in progress, to guard this channel against intrusion by other callers. At the same time and for one occurrence only of this time channel, the calling station 17 inserts its own digital identity, in binary code, into the relevant ones of the time slots 6–12, as indicated in dotted outline in waveform (b). This latter data plays no part in the establishment of the call, being provided for call recording purposes within the central control equipment, if required. As will be further explained in more detail below, the station 17 also records the identity of the time channel, relative to its numerical position in the TDM frame of time channels, to enable the time channel to be recognised when it occurs in subsequent time channel frames; this data also provides the information necessary for the setting of the station line coupling switch to the two wire line link to be used for the call. The caller now keys the second digit of the wanted number, which is also registered within the station control apparatus, so that when the seized time channel next occurs, the two digits of the wanted number can be inserted in binary code into the relevant ones of the time slots 6–12, as indicated, by waveform (c). The station 17 control apparatus is arranged to insert this called number identity in only five successive occurrences of this time channel and during this time the station awaits receipt of an acknowledgment from the called station 28.

Each station of the system is arranged to continuously scan the data time channels as they occur and to lock-on to any data time channel whose address portion time slots are presenting the station's own digital identity. Thus when station No. 28 detects the occurrence of its own digital identity in the time channel taken into use for this call, it will lock-on to this time channel by registering its numerical identity. This also provides the data required for setting the station 28 line coupling switch to the corresponding two wire link. If station 28 is free, its control equipment will respond by generating a tone sounder ringing signal to give audible indication of the incoming call, and by inserting an acknowledge bit in time slot 3 of the data channel when it next occurs. If station 28 is already engaged on another call then it will withhold the acknowledgment bit from this time channel and no tone sounder ringing signal will be generated.

At the calling station 17, if, during the five successive appearances of this time channel, no acknowledgment bit is detected in time slot 3 then, as indicated by waveform (d), the station 17 control equipment will clear all data from the time channel, thus releasing it for use on other calls, and at the same time will initiate the generation of busy tone, which persists until the station 17 handset is replaced. Assuming, however, that the called station 28 is free, then during one of the five successive occurrences of this time channel, the acknowledgment bit will be detected in time slot 3, as indicated in waveform (s). Detection of the acknowledgment bit causes the station 17 control equipment to generate a ringing tone signal to indicate that the called station is being rung.

Upon removal of the handset at station 28, the generation of the tone sounder ringing signal thereat is terminated and upon the next occurrence of this data time channel, the station 28 control apparatus inserts an "answer" data bit in time slot 2. See waveform (f). At the same time the station 28 line coupling switch is set to connect the station to the two wire link to be used for the call.

At station 17, detection of the answer bit in time slot 2 of the data channel brings about the termination of the ringing tone signal, and the setting of the station 17 line coupling switch to the two wire link to be used for the call, also all address data is cleared from the address portion of this time channel, and conversation can now ensue. The calling station maintains the busy bit in time slot 4 and the called station maintains the acknowledge and answer bits in time slots 3 and 2 respectively. Both telephones now must have acknowledge and busy bits present in the respective channel time slots. Failure to detect either of these will re-set the station control circuit, clear the line and initiate the generation of dial tone. Thus the call may be cleared from either end by restoration of a station handset.

At any time after the commencement of conversation, it is possible to establish a conference call using the same time channel and connecting link, taken into use for the original two party call. Thus, assume that in the call described above, the calling station 17 wishes to call-in a third party station. To do this, the discriminating digit 8 is keyed at the calling station 17. This is detected by the station 17 control apparatus which responds by resetting the address digit registers within itself. The address digits of the wanted third party station are now keyed and the corresponding binary codes are inserted into the time slots 6–12 of the data channel when it next occurs. In the manner previously described, this address identity is recognised by the third party station and a tone sounder ringing signal is initiated therat. In this case, however, since the calling station 17 is already connected to the called station 28, no ringing tone or busy signals are provided in respect of the third party station. When the third party station handset is removed, that station line coupling switch is also set to the two wire line being used for the call so that the third party may answer verbally. If no verbal answer is received, or if received, a fourth party station is to be called, the operation described above is repeated, the keying of the discriminating digit 8, bringing about the re-setting of the station 17 address registers, in readiness for the receipt of the fourth station address digits. This action may be repeated to call in further stations, as required.

Considering now the waveforms established in a time channel of the TDM system taken into use for a call outgoing from the system over an external exchange line, as previously described, exchange line time channels are marked, from the central control equipment, by the presence of a data bit in time slot 1, see waveform (g). Thus, to establish an external exchange line call from a station of the system, the prefix digit "9" is keyed to condition the station control apparatus for an exchange call, so that the station control looks for a free exchange line time channel, i.e. one which is clear of data except for the exchange line bit in time slot 1. If after one complete frame of the TDM system no free exchange line time channel is detected, an equipment busy tone will be generated within the caller's instrument to inform him that all external exchange lines are engaged. Assuming, however, that a free exchange line time channel is detected, this is seized, a "busy" bit is inserted in time slot 4 of the channel together with the caller's station identity, the latter being inserted for one occurrence only of the time channel, as described above for a local call, see waveform (h). The station line selecting switch is also set to the corresponding exchange line link and a calling condition is applied to the external exchange line. The call now proceeds under public exchange control. Thus upon receipt of the public exchange dial tone, the required exchange number is keyed out, digit by digit, the digits being inserted, one at a time, in binary code, in time slots 9-12, each code being flashed for one occurrence only of the time channel, as previously described, see waveform (f), which indicates a first digit 6, for example, inserted in binary code in respective ones of the time slots 6-12. In the central control equipment the register sender element of the associated exchange line unit registers the digital codes representing the wanted exchange line number and transmits the digits to the exchange, in the manner suited to the exchange, for example, as trains of impulses, multi-frequency signals, or the like. The call now proceeds under external exchange control, the exchange line time channel being marked busy by the continued insertion of the busy bit in time slot 4 by the station control equipment, this bit being cleared at the end of the call upon restoration of the caller's handset.

At any time during an external exchange call the caller may operate the hold button at his station to cause a hold condition to be applied to the exchange line from the associated exchange line unit in the central control equipment. Thus, operation of the hold button causes the station control equipment to remove the "busy" bit from time slot 4 and insert a "hold" bit in time slot 5 of the time channel being used for the original external call, as indicated by waveform (k). The control equipment also initiates generation of a special dial tone to indicate to the caller that he may now proceed to set up the required enquiry call, and, if required, may also cause a warning lamp on the station instrument to light up. In the central control line circuit unit, detection of the hold data bit effects the setting of a bistable element which, when set operates a hold relay in the exchange line circuit. Operation of the hold relay disconnects the speech path through the line circuit and applies a suitable line hold termination to the exchange line.

The caller may establish an internal enquiry call, using the exchange time slot taken into use for the original exchange call, or he may establish a second exchange line call, taking another exchange line time channel into use. For an internal enquiry call, for example to station 28, the caller keys the digits of the wanted number and upon the next occurrence of the exchange line time channel, the binary codes representing these digits are inserted into appropriate ones of the time slots 6-12, as indicated by waveform (l). As previously described for a local call, the digital codes are maintained for a maximum of five time channel occurrences, while the calling station awaits the appearance of an acknowledge bit in time slot 3. If no acknowledgement bit is detected during the five time channel occurrences, then the digital data is cleared from the time channel address portion and busy tone is generated within the calling station, see waveform (m). If the acknowledgment bit is detected, as indicated in waveform (n), then ring tone is generated at the caller's instrument to indicate that the called enquiry station is being rung. Removal of the handset at station 28 causes an answer bit to be inserted in time slot 2 of the time channel, as indicated by waveform (p), and the station 28 line selecting switch to set to the exchange line link which provides the speech path for the enquiry call. At the calling station detection of the answer bit removes the digital address data from the address portion of the exchange line time slot, and the enquiry conversation can now ensue.

At the termination of the enquiry call, the caller may return to the original external call or he may transfer the external call to the enquiry station. In the former case, the enquiry station clears down, while in the latter case the calling station clears down. If the called enquiry station clears down, the calling station may retrieve the external call by operating the station hold button. This causes the station control apparatus to remove the "hold" bit from time slot 5 and to re-insert the "busy" bit in time slot 4 of the exchange line time slot, see waveform (q). In the associated exchange line unit, detection of the logic reversal of the busy and hold bits causes the bistable element therein to reset, thus releasing the hold relay to re-establish the speech path and remove the hold condition from the exchange line.

For an external enquiry call, the caller proceeds exactly as described above for the first external call, that is, he dials the prefix digit 9, to seize a second exchange line time channel over which he keys the number of the wanted external enquiry number. At any time during the enquiry conversation, by again operating the station hold button, a hold condition can be applied to the second exchange line in exactly the same way as described for the first exchange line and as before, the caller will receive the locally generated special dial tone, whereupon he may set up an internal enquiry call, using the second exchange line time channel, in exactly the same way as described above for the first internal enquiry call. Should the called internal enquiry station clear down, the caller will again receive the special dial tone and he may proceed to set up a second internal enquiry call, and he can do this as many times as required. Whether or not the caller makes an internal enquiry call, he may retrieve the first exchange line by again operating the station hold button. It will be noted that the previous operation of the hold button resulted in the caller receiving special dial tone and a hold condition was applied to the second exchange line due to the "busy" and "hold" data bits having the binary significance "0" and "1" respectively. By again operating the hold button, the binary significance of the "busy" and "hold" bits is inverted and becomes "1" and "0" respectively. In this condition it may be arranged that the first held line is retrieved in the manner previously described. However, should it be that the caller wishes to retrieve the second called line, he may repeat the sequence of hold button operations. That is, press hold to re-apply the hold condition to the first exchange line, press hold again to retrieve the second held exchange line. Having retrieved the required external line, conversation may ensue as previously described and at the termination of this call, the caller must restore his handset in order to clear down the public exchange apparatus taken into use for the call. However, it is a feature of the proposed system that should the caller restore his handset, either accidentally or of necessity, while he is still holding an exchange line, then the instrument tone sounder is automatically energised to give audible indication of the situation. Upon removal of the station handset, the caller, once again, receives the special dial tone, and by again operating the station hold button, the held exchange line is retrieved. At the end of this call, restoration of the caller's handset restores both the public exchange and the system equipment to normal.

For external calls incoming to the system, a common ringer may be provided, the system being arranged so that any station of the system may answer the call by keying the prefix digit "0." Assume a call is incoming over one of the exchange lines in FIG. 1, this will be detected by the ringing signal detector in the line circuit unit associated with that exchange line, which responds by applying a data bit in time slot 3 of the associated external line time channel, which serves as the "ring" time slot on external line calls, see waveform (r). The common ringer is connected to the data highway over a logic element, adapted to respond to the time slot control portion data pattern 1,0,1,0,0 indicated in waveform (r) and in response thereto, to effect operation of the common ringer. In any station of the system, keying of the digit "0" conditions the control apparatus of that station to look for the time channel having the defined control portion data pattern, and when this is detected the station control apparatus locks-on to this time channel as previously described and applies a "busy" bit in its time slot 4. This is detected by the logic element of the associated exchange line circuit unit which responds by removing the ring bit from the time slot 3, thus terminating operation of the common ringer, and upon removal of the answering station handset, that station is connected through to the calling exchange line, see waveform (s). The answering station may now proceed to establish transfer or enquiry calls by operation of his station hold button, in the manner previously described for an incoming call.

Referring now to FIG. 3 of the drawings, this shows, in block schematic form, sufficient of the station control apparatus, provided for each station of the system, to enable the operation of the system to be clearly understood. Incoming at the left-hand side of the drawing are the supply leads SL1, SL2, SL3 and the data highway DAH. As previously mentioned, the lead SL1 is a common return lead for the DC supplies, SL2 is the 50V supply lead for the relays constituting the line coupling switch LCS, while lead SL3 carries the 30V DC supply for the electronic control apparatus and a superimposed AC timing signal of precisely controlled frequency.

As described above with reference to FIG. 1, these supplies are fed from sources located within the central control equipment. From lead SL3, the 30V. DC supply and the AC. timing signal are separated by means of the filter element FE, from whose output the 30V DC supply is obtained and the capacitor CA via which the AC timing signal is applied to control the operation of a phase locked oscillator PLO. In this way the several station oscillators are caused to oscillate in step with one another and within close tolerance also in phase alignment with one another and with the master oscillator in the central control equipment. The output from the oscillator PLO is applied to a clock pulse generator CPG which provides output timing pulses as the bit or time slot recurrence frequency of the TDM system, the clock pulses CK1 occurring at the centre of each time slot period while the clock pulses CK2 mark the start of each time slot period. These clock pulses are utilised within the electronic station control equipment to control the reading and writing of data from and to the data highway DAH, in well known manner. The clock pulses CK2 also drive two counting chains CN1 and CN2 in tandem. The counting chain CN1 comprises a number of counting stages equal to the number of time slots in a data time channel of the T.D.M. system, that is, 12 stages in the present instance. Each time the counter CN1 is set to its 12th counting condition, it provides an output clock pulse CK3 which marks the onset of the 12th time slot in each channel. Also each time this counter is returned from its 12th to its first counting condition it provides an output drive pulse to step the counter CN2, so that this counter is stopped at the onset of time slot 1 of each channel period. The counting chain CN2 has a number of counting stages equal to the number of time channels in one frame of the TDM system, that is 17 stages in the present instance. The time channels 1–16 are data time channels of the TDM system and as these are counted, the counter CN2 provides output code markings over a group of four marking leads OML to indicate in binary code, the numerical identities of the time channels as they are counted, relative to the frame of time channels. The seventeenth time channel in each time channel frame carries a synchronising pattern which is transmitted from the central control equipment as previously described over the data highway DAH. In the station control apparatus, the synchronising pattern is detected by a synchonising pattern detector element SPD whose input is connected to the data highway DAH, and whose output is a pulse which occurs at the end of the 17th time channel and which is applied to re-set the counters CN1 and CN2. Thus it is ensured that the counters CN1 and CN2 cannot remain out of step with the corresponding counting chains in other stations of the system for longer than one frame period of the TDM system.

The data highway DAH is also connected to the input to a receive shift register SR1 and to the output from a send shift register SR2. During each data time channel period, the control and address data bits are read into the receive shift register SR1, serially, under control of the bit sensing clock pulses CK1., and are read out in parallel form in time slot 12 of the channel period under control of the clock pulses CK3. Thus during the 12th time slot period of each channel, the control data bits relevant to the channel appear from the respective outputs 1–5, while the station address data bits appear from the outputs 6–12 of the receive shift register. The control data bits pass via buffer amplifiers BUA1 to a logic element LEM. This logic element comprises simple electronic switching and discriminating arrangements which may take any well known form and are consequently not described in detail; the functions of the logic element will, however, be closer from the further description given below. The address data bits pass via the buffer amplifiers BUA2 to one side of a comparator element COMP1, to the other side of which output markings from the own number store ONS are applied. This own number store, stores the address data bits identifying this station and is arranged so that it can be set up to mark a station identity by wire strappings or the like, for example by means of an insertable printed circuit card, or by screw-in connecting plugs, or in any other manner such that the identity of a station can be established or changed, from the exterior of the instrument case. The comparator COMP1 is arranged to provide a "yes" output signal to the logic element LEM over lead LI1, whenever it detects coincidence between a received data address and the "own number" address of this station. The outputs from the store CNS are also applied to respective inputs to a set of coincidence of two gates, indicated by the rectangle GSA the second input to each of these gates being connected in common to the output lead LO1 from the logic element LEM.

The send shift register SR2, is arranged to accept data in parallel form during time slot 1 of a channel period and to read this data out on to the data highway serially, in time slot periods 2-12 of the channel, under control of the clock pulses CK2. It will be recalled that the data bit which appears in the time slot 1 of a channel, is the exchange line data bit which is inserted from the central control equipment when required and consequently the station control apparatus is never required to insert a data bit in time slot 1. The control data bits 2-5 inclusive are applied to the corresponding stages of the shift register SR2 from the logic element LEM over a group of leads LCD. While the address data bits 6-12 are applied to the correspnding stages from the outputs from the gates GSA, over leads LCA, or from the station keypad as described below.

The station digit sending keypad is indicated in FIG. 3 by the symbol designated KP. Upon the operation of a digit key, the keypad provides an output binary code in parallel form over the four code marking leads DML. These code markings pass via an anti-bounce element which may be of any well known form to the logic element LEM, which discriminates on the value of the first digit keyed. The digital codes also pass to a key-pad store KPS which is arranged to store the two digits of a station identity as they are keyed and to provide code outouts representing the two digits over the seven output leads SDL, these leads being arranged in groups of three and four, to carry the first and second digit codes, respectively. The outputs from the keypad store are applied to respective inputs of a further set of coincidence gates GSB, each having its second input connected to the lead LO2 from the logic element LEM.

The logic element LEM also includes tone ringing signal generating means, the output from which is applied over lead LO3 to energise the station tone ringer TRE, when required, and also includes means for generating other tone signals such as dial tone, busy tone, etc., and these are applied over lead LO4 to the coupling transformer CTR, to couple the tones on to the station line wires "T" and "R" to which the telephone speech transmission circuit, indicated by the symbol designated TTE, is connected, so that the user hears these tones in the earphone of the telephone handset. The station also provides the usual hook switch contacts HS which close upon removal of the station handset to apply an earth signal to the logic element over lead LI2, and a push button switch PB which, when operated applies another earth signal to the logic element over lead LI3.

The numerical channel identities fed from the channel counter CN2 over the code marking leads CML are applied to channel number stores, of which three, designated CNS1, CNS2 and CNS3 are shown in FIG. 3. These codes are also applied to a comparator element COMP2. A logic switching element LSE is associated with the channel number stores and with the comparator COMP2, and operates under control of signals fed to it from the logic element LEM over leads SL1, SL2 and SL3 to associate the comparator with a particular channel store and also to cause that store to record and thus lock the station on to the channel identity being presented to it at the time the signal is received from the logic element LEM. Thus at each subsequent occurrence of this time channel upon the comparator detecting coincidence between the channel identity fed to it from the channel counter CN2 and that stored by the channel number store, with which it is associated, the comparator responds by applying a "yes" output signal to the logic element LEM. The channel number store outputs are also switched through to a set of coincidence gates GSC, whose second inputs are commoned to a signal lead LO6 from the logic element LEM, and whose outputs are passed to the station link coupling switch LCS, which operates to switch the station line wires T and R through to that one of the line link pairs LL1-LL3 and EL1-EL5, which corresponds to the data time channel concerned.

The general manner of operation of the station control arrangements shown in FIG. 3 will now be described. Assume firstly that the station is taken into use to establish an internal call to another station of the system. Removal of the station handset causes the hook switch contacts HS to close, thereby applying a calling signal over lead LI2 to the logic element LEM. Receipt of the calling signal causes the logic element to generate its own dial tone which it applies to the station instrument over lead LO4, and upon hearing this, the caller proceeds to key the two digits of the wanted number. The binary codes representing the digits keyed are applied successively, from the keypad KP over the code marking leads DML and the anti-bounce element ABC, to the logic element LEM and to the keypad store KPS, which stores the keyed digits. The logic element LEM discriminates on the value of the first keyed digit to determine that it is not one of the prefix digits "8," "9," or "0" previously described, thus determining that an internal call is required. As a result of this discrimination the logic element is conditioned to scan the control portion data bits of each channel of the LEM system, as these are read out from the receive shift register SR1, via the buffer amplifiers BUA1, and to respond to the first free internal link, data channel whose five control portion data bits are all at binary "0." If, after one complete frame of data time channels have thus been scanned without the detection of a free internal link data time channel, then the logic element generates a local equipment busy signal which it applies to the station instrument over lead LO4, and at the same time applies a signal over lead LO5 to re-set the keypad store KPS. Assuming, however, that a free internal link data channel is detected, then the logic element responds by applying a signal over lead SL1 to cause the first channel number store CNS1 to register the identity of this time channel and to couple the comparator COMP2 to this store. It will be recalled that the data bits from a time channel of the system are read out from the receive shift register SR1 in time slot 12 of the data channel, while the channel counter CN2 is stepped in time slot 1 of the next data time channel, so that detection and registration of a free data channel must be effected within the 12th time slot period of the data channel concerned. However, since the various elements which comprise a station control apparatus are formed as a single high speed integrated circuit element, this timing condition is adequately met.

When the channel taken into use for this call next occurs, the comparator COMP2 will detect coincidence between the channel identity stored in the channel number store CMS1 and that fed to it from the output of the counter CM2 and will respond in the first time slot of the channel period by passing a "yes" signal to the logic element LEM over lead LI4. In the sequence of operations which the logic element is now conditioned to perform, receipt of the COMP2 "yes" signal causes the logic element to apply a gating signal over lead LO1, for one time slot period only, to gate the stations own identity stored in the own number store ONS, through to stages 6-12 respectively, of the send shift register SR2. At the same time the logic element applies a busy control data bit to stage 4 of the send shift register, and this data bit is maintained for the duration of the call. The information thus registered in parallel form within the send shift register is read out serially, under control of the clock pulses CK2, onto the data highway DAH, in time slots 2-12 of the data channel taken into use for the call.

Upon receipt of the COMP2 "yes" output when this time channel next occurs, a signal is applied from the logic element LEM over lead LO2 to operate the gates GSB, to pass the wanted station identity codes from the keypad store to the send shift register stages 6-12, and this data, together with the busy control bit which is again inserted in stage 4, is read out on to the data highway. As previously described, this data is repeated at the next four occurrences of this data channel, or until the logic element detects the occurrence of an "acknowledge" data bit in time slot 3 of the control portion of the data channel when this is read to it from the receive shift register SR1. If the acknowledge bit is not detected during the next four occurrences of the data channel, then the logic element proceeds to generate busy tone, which is passed over lead LO4 to the station instrument, at the same time the logic element clears down all data stores, including the channel number store CNS1, so that this data channel is rendered available for use on other calls, the generation of busy tone is terminated, upon restoration of the station handset and the opening of the hook switch contacts HS. Assuming however, that the acknowledgment signal is detected before the elapse of the next four time channel cycles, then the logic element will generate a local ring tone and will apply this tone to the station instrument over lead LO4 to indicate to the caller that the called station is being rung, as previously described.

When the handset of the called station is removed to answer the call, and "answer" data bit appears in time slot 2 of the control portion of the data channel and upon detection of this data bit the logic element applies a signal over lead LO6 to operate the gates GSC, which open to pass the channel identity code through to the line coupling switch LCS which, as previously described, operates to connect the station line wires T and R through to that one of the local line link pairs LL1-LL3, to which the data channel taken into use for the call corresponds. At the same time a signal is applied over lead LO5 to re-set the keypad store, so that all address data is cleared from the address portion of this time channel and conversation may now ensue. During conversation, the logic element at the calling station continues to insert the "busy" bit in time slot 4 of the data channel, while the called station logic element continues to insert the "acknowledge" and "answer" bits in time slots 3 and 2 respectively the continued holding of this data channel being contingent upon the detection of these data bits in both the calling and called stations. Thus, should one of the stations clear down by replacement of the station handset and the consequent opening of the back switch contacts HS, that station control element will terminate the insertion of its control data bit or bits, so that these will no longer be received by the other station, which will, therefore, also clear down, releasing the data channel and generating local dial tone until the handset at that station is also restored.

At any time while conversation is in progress on the above call, the caller may wish to call in another station of the system to establish a conference call and as previously described, he does this by first keying the prefix digit "8" and then keying the address digits of the second wanted station. Upon detection of the prefix digit 8, the logic element applies a signal to lead LO5 to re-set the keypad stored KPs, which is thus prepared to accept the station identifying digits as these are keyed out from the station keypad. In the manner above described, upon the next occurrence of the time channel taken into use for the call of the logic element applies a gating signal over lead LO2 to operate the gates GSB to gate the address data stored in the keypad store into the send shift register SR1 and this data is read out on to the data highway DAH in the respective time slots 6-12 of the data channel. Since the answer, acknowledge and busy bits are also inserted in time slots 2-4 of the data channel to maintain the original call, the acknowledge and answer signals generated by the second called station are ineffective and the caller awaits a verbal answer from the second called station. As also previously described the above described sequence of operations may be repeated to call in further stations to this conference call and each station when it answers, becomes connected on to the two wire link taken into use for the original call so that conversation may ensue between the stations. Stations called in to a conference call may clear down from the conference call by restoring the station handset without affecting the original connection which will be maintained until all the called stations clear down, or until the original caller clears down.

As previously described, the receive shift register SR1 continuously reads the data from each time channel of the TDM system. If the station is being called, then the station's own address will be read out from the receive shift register in the data time channel taken into use by the calling station and will be applied via the buffer amplifiers BUA2 to the comparator COMP1, to which the stations own address is also applied from the own number store ONS. In response to the identity of addresses presented to it, the comparator COMP1 applies a "yes" output signal to the station logic element LEM, which responds by applying an output signal over one of the leads SL1-SL3, depending upon whether or not the station is already engaged upon another call or calls, to cause a vacant one of the stores CNS1-CNS3 to accept the channel identity being presented to it from the channel counter CN2 and to couple its output to the comparator COMP2. At the same time the logic element LEM is set to operate in a "called" mode, so that, when the comparator COMP2 responds to the next occurrence of this data time channel, its "yes" output signal causes the logic element LEM to apply an "acknowledge" signal to that one of the output control leads LCD which is connected to stage 3 of the send shift register SR2. At the same time, the generation of a tone ringing signal is initiated and this is applied over lead LO3 to operate the station tone ringer TRE. During the stepping action of the send shift register, the "acknowledge" bit is inserted into time slot 3 of the data time channel taken into use for the call, causing the calling station to respond in the manner previously described. Upon removal of the called station handset, the hook switch contacts HS close to apply a signal over lead LI2 to the logic element LEM which, in the called mode, responds upon the next occurrence of this data time channel by terminating the generation of the tone ringing signal, applying an "answer" signal to that one of the output control leads LCD which is connected to stage 4 of the send shift register SR2, and by applying a signal over lead LO6 to actuate the gates GSC to pass the data time channel identity code through to the line coupling switch LCS to cause this to set to the line link pair corresponding to the data time channel taken into use for the call. In the manner previously described the "answer" bit is inserted into time slot 2 of the data time channel in the stepping action of the send shift register to inform the calling station that the called station has answered and conversation may now ensue, as previously described. Had this station been busy when called then, apart from registering the identity of the data time channel over which it is being called, the generation of the ringing tone signal and the insertion of the "acknowledge" signal would be inhibited and no further action in response to this call occurs until the calling station clears in response to the generation of busy tone there at as previously described, causing removal of all address and control data from this time channel in consequence of which, the channel number store and associated logic taken into use in response to the call at this station, are restored.

For an external exchange line call, the control equipment functions, initially in a manner generally similar to that described above for an internal call, except that for an exchange line call the first digit keyed is the prefix digit "9," upon receipt of which the logic element LEM is set to a "calling exchange" mode in which it scans the successive time channels for a free exchange line channel, that is one in which the pattern of control data bits in the first five time slots of the channel is 10000, the data bit in time slot 1 being the exchange line marking bit as previously explained. If no free exchange line data channel occurs during one complete frame of data channels, then equipment busy tone will be generated and aplied to the station telephone over lead LO4. If, however, a free exchange line data channel is encountered then, in the manner previously described, the identity of this data channel is recorded by the channel number store CNS1, and upon the next occurrence of this channel, a "busy" control bit is inserted in its time slot 4 and the station's own identity is flashed during one occurrence only of the channel. Also, a signal is passed over lead LO5 to re-set the keypad store KPS and a signal is passed over lead LO6 to operate the gates GSC, which pass the channel identity code markings to the line coupling switch LCS, which is thereby set to connect the station line wires T & R through to the exchange link pair, (one of ELI-EL5), which corresponds to the exchange line data channel taken into use for the call. As previously explained in the central control unit, the exchange line circuit unit, upon detection of the busy bit in time slot 4 of its data channel, causes the external exchange line to be switched through to the associated exchange line link, so that the distant public exchange responds to the calling condition extended to it from the calling station and returns dial tone in the normal way. Upon hearing the public exchange dial tone, the caller proceeds to key out the digits of the wanted directory number, into the keypad store KPS. During each occurrence of this exchange line data channel subsequent to the resetting of the keypad store, upon receipt of the "yes" signal from the comparator COMP2, over lead LI4, the logic element LEM applies a signal over lead LO2 to the gates GSB. Thus as each digit is keyed into the keypad store KPS, it is read out, upon the next occurrence of this exchange line time channel, via gates GSB into stages 9–12 inclusive of the send shift register SR2, which, in the manner previously described inserts these data bits, together with the "busy" data bit in time slot 4, into the corresponding time slots of the data channel which is then occurring on the data highway DAH. As previously explained, the digital codes appearing in time slots 9–12 of this data time channel are registered by the corresponding exchange line circuit unit of the central control element, and are re-transmitted for example as trains of impulses, over the external exchange line to the distant public exchange. The caller now hears all tones transmitted from the public exchange, and when the called subscriber answers, conversation may ensue.

As previously explained for a call incoming over an external exchange line, the central control exchange line circuit associated with the calling exchange line responds to the calling condition by inserting a "ring" data bit in time slot 3 of the corresponding exchange line data time channel. The control portion of this data time channel thus presents the binary pattern 10100 when it occurs on the data highway DAH and the common ringer element responds to this control portion pattern causing the common ringer to operate. Assuming the station shown in FIG. 3 wishes to answer this incoming call, the station handset is removed causing the hookswitch contacts HS to close, thereby extending a signal over lead LI2 to prepare the logic element LEM to receive the first digit keyed out from the keypad KP. In this case, the discriminating digit "0" is keyed and receipt of this digit conditions the logic element to scan the successive data time channels in search of the one whose control portion has the above described binary pattern. Upon detection of this channel control portion pattern, the logic element locks on the channel by causing its identity to be stored within the channel number store CNS1. When this data time channel next occurs on the data highway, the logic element responds by flashing the station's own identity, and by inserting a "busy" bit in time slot 4 of the data channel, the data being inserted via the send shift register in the manner previously described. At the same time the logic element LEM applies a signal over lead LO6 to operate gates GSC to pass the channel identity to set the line coupling switch LCS to the exchange line link to which this data channel corresponds. Upon detection of the "busy" bit in the time slot 4 of its associated data time channel, the exchange line circuit removes the "ring" bit from the time slot 3, to terminate the operation of the common ringer and at the same time switches the calling exchange line through to the answering station so that conversation may ensue.

While this station is engaged on an external call, either incoming or outgoing, the user may cause a hold condition to be applied to the exchange line by operation of the station "hold" button PB, as previously described. Thus, when the station hold button PB is operated, a signal is passed to the logic element LEM over lead LI3. Upon the next occurrence of the exchange line data time channel concerned, the logic element responds by inserting a "hold" data bit in stage 5 and by withholding the "busy" bit from stage 4 of the send shift register, thus causing the "busy" bit to be removed from time slot 4 and replaced by the "hold" bit in time slot 5 of this data time channel. At the same time a special dial tone is generated and applied to the station instrument over lead L04. The user may now establish an internal enquiry connection to another station of the system in the manner previously described, using the exchange line data time channel, whose identity is already stored in the channel number store CNS1, and the exchange line link to which the line coupling switch LCS is already set. Alternatively, the user may wish to establish an external enquiry call over another of the exchange lines to which the system has access. In this case, the user upon hearing the special dial tone, proceeds to key the prefix digit "9, " upon receipt of which the logic element LEM is conditioned to respond to the first free exchange line data time channel, in the manner previously described for the first exchange line call. In this case, however, when a free exchange line data time slot occurs, the logic element applies a signal over lead SL2 to cause this channel identity to be registered in the channel number store CNS2, the logic switching elements LS5 being arranged to couple the comparator COMP2, to the outputs from both these stores. Also the inputs to the gates GSC are switched from the store CNS1 to the store CNS2, so that the line coupling switch is re-set and then set to the exchange line corresponding to the channel identity stored in the channel number store CNS2. The call now proceeds in the manner previously described for the original exchange line call. Each time the first exchange line data channel, whose identity is stored in channel number store CNS1, occurs, a comparator output pulse is applied to the logic element LEM, over lead LI4 and the logic element responds to this pulse by continuing to insert the "hold" data bit in time slot 5 of this first exchange line data channel. Similarly, each time the second exchange line data channel occurs, a comparator output pulse is applied to the logic element LEM over lead L15 to which the logic element responds by continuing to insert a "busy" data bit in time slot 4 of this second exchange line data channel.

In the case of the internal enquir, call described above, should this calling station wish to transfer the original external call to the called enquiry station, this is achieved upon the restoration of the instrument handset at this calling station, without the caller having to perform any other controlling operations. Thus, upon restoration of the station handset, the switchhook signal is removed from lead L12 by the opening of the HS contacts, thus causing this station to restore to normal, with the consequent removal of the hold data bit from time slot 5 of the exchange line data time channel. In the called enquiry station, which, it will be appreciated, is already storing all the data relevant to this call, the absence of the "hold" data bit is detected by that station's logic element, and this is accepted as a signal indicating that the calling station has cleared and that this called station must now accept the external line call, which it does by causing a "busy" data bit to be inserted in time slot 4 of the data channel. In the exchange line circuit unit associated with the external exchange line in question, the removal of the "hold" data bit and the occurrence of the "busy" data bit in its associated data time channel causes the exchange line circuit to remove the hold condition and to reconnect the through speech path between the exchange line link and the external exchange line, so that conversation may now ensue between the called enquiry station and the external public exchange subscriber. However, had the called enquiry station not wished to accept the external line call, then the called enquiry station would have been cleared down by restoration of that station's handset, thus removing the "answer" and "acknowledge" data bits which it had contributed to the control data in the exchange line data channel concerned. Upon detection of the absence of these data bits, the calling enquiry station is thereby informed that the called enquiry station has cleared, and the calling enquiry station reverts to the pre-enquiry condition with the generation of special dial tone, as previously described. Assuming that no further enquiry calls are required, this station may retrieve the external line call by re-operating the station hold button PB, thus applying a second signal over lead L13 to the logic element LEM, which responds by removing the "hold" data bit from time slot 5 and re-inserting the "busy" data bit in time slot 4 of the exchange line data channel, thus causing the exchange line to be switched through from the exchange line circuit unit as described above.

In the case of the external enquiry call, the caller may cause a hold condition to be applied to this exchange line in exactly the same way as described above for the original exchange line call, and he may proceed to establish an internal enquiry call using this second exchange line data channel, effecting transfer or returning to the external enquiry call, exactly as described above for the internal enquiry call using the first exchange line data channel. Should the caller return to the external enquiry call, then this call may be terminated by restoration of the station handset. In this condition, where a further exchange line is still being held by this station, restoration of the station handset and the consequent removal of the hookswitch signal on lead LI2, causes the logic element LEM to to remove its output signal from lead SL2, thus restoring the channel number store CNS2 and the line coupling switch LCS. The occurrence of the "busy" data bit in time slot 4 of this data channel is terminated with the result that the associated exchange line circuit restores to normal, releasing the external exchange line and the apparatus taken into use for the call in the distant public exchange. However, the station does not completely clear down, but generates the tone ringing signal which it applies to the station tone ringer TRE, to remind the caller that a further exchange line is still in hold, and remains to be dealt with. Upon hearing the tone ringing signal, the caller again removes the station handset, with the consequent re-application of the hookswitch signal on lead LI2. Upon detection of the signal on lead LI2, the tone ringing signal is terminated and the logic element applies signals to its outputs leads SL1 and L06. The signal on lead SL1 causes the inputs to the gates GSC to be reconnected to the outputs from the channel number store CNS1, while the signal on lead L06 opens the gates CSC to pass the channel identity, stores in the channel number store CNS1, to the line coupling switch LCS causing this switch to set to the exchange line link to which this channel identity corresponds. In addition the special dial tone signal is generated and applied to the station instrument over lead L04. Assuming no further enquiry calls are required, the station push button may now be operated to retrieve the external exchange line call, in the manner previously described.

There are several variations in the details of operation which may be employed without going beyond the scope of the invention. Some examples of variations which seem promising are given below.

The number of time slots in the time data channels may be increased from 12 to 13 or 14. One of the extra time slots can then be used for a positive busy indication by a called station, thus avoiding the need for the negative approach described which assumes a station is busy if it does not respond after five consecutive frames calling it. The other additional time slot can be used to enable the digits 8, 9 or 0 to be included as first digits in the numbering scheme.

The tones (busy, unobtainable, ringing etc.) can be generated centrally and distributed by super-position on the common supply lines. All the interrupted tones can be distributed sequentially on one supply line and the telephone instrument chooses the one required. An advantage of central generation of tones is simplification of the circuitry in the telephone instruments; the system can be improved for conference calls by removing the acknowledge bit when a call is answered so that an existing call is held only by the presence of the originating busy bit and the answering bit. This leaves the acknowledge bit free for use when calling the third telephone to an existing conversation so that tones indicating the state of the third telephone can be generated. It also enables the third telephone's identity to be removed from the time channel when the third telephone answers so that further telephones may be called into conference.

What is claimed is:

1. A telephone intercommunications system comprising
    a plurality of service terminal points at least some of which are constituted by the telephone stations of the system,
    a plurality of space-divided speech channels, there being fewer speech channels than service terminal points,
    switch means individual to each telephone station for selectively linking said speech channels to said telephone stations,
    a data highway, space-divided from the speech channels and linked to the service terminal points,
    a common data synchronising means arranged to operate said data highway to provide a plurality of data channels in time-division multiplex for passing data between the service terminal points, and
    electronic means in association with each telephone station, said electronic means comprising
        means for generating a cyclically recurring frame of data time channels under the control of the common data synchronizing means, each frame of recurring data time channels accommodating one discrete data time channel at a time position corresponding to and identifying each speech channel,
        means for writing data appertaining to a call in a selected data time channel,
        means for reading during each of the data time channels data inserted in the data time channels by the writing means of other stations,
        means for recognising a data pattern relevant to the station inserted in a data time channel by another station,
        means for causing the switch means associated with the station to be set to link the station to a speech channel identified by the time channel containing ythe written or recognised data,
        means for receiving user instructions from the station, and
        means for signalling to a user of the station, whereby any pair of said electronic means provides control means sufficient for originating and receiving calls between their respective stations over one of said speech channels.

2. A system as claimed in claim 1, wherein the data highway is constituted by a pair of conductors.

3. A system as claimed in claim 1, wherein the speech channels are constituted by separate pairs of conductors.

4. A system as claimed in claim 1, wherein the switch means at each station for linking the station selectively to the speech channels comprise the contacts of a multi-contact relay.

5. A system as claimed in claim 1, wherein substantially all of said electronic means at each of said telephone stations are provided by a single integrated circuit element.

6. A system as claimed in claim 5, wherein each time-multiplexed data channel period is subdivided into two groups of data-bit time-slots, one group for the transmission of binary codes individual to the service station points and the other group for the transmission of signal and control data.

7. A system as claimed in claim 6, wherein each station includes electronic means to count the data channels continuously in every frame, and to read continuously the data words appearing in the data channels, said recognising means comprising means for detecting identity between at least part of a received data word and a data pattern stored at the station and individual thereto.

8. A system as claimed in claim 7, wherein electronic means are provided for storing the identity of a channel whose data pattern has been recognised by the recognising means, the storing means being connected to the channel counting means to store the channel identity occurring on the detection of identity by the recognising means.

9. A system as claimed in claim 8, wherein the switch means at a station are responsive to operation of the storing means to link the station to the speech channel identified by the store.

10. A system as claimed in claim 1, wherein one or more of the service terminal points are terminal points of exchange lines and for each exchange line there is a speech channel and a data time channel individual thereto.

11. A system as claimed in claim 1, wherein said writing means comprises means for seizing the first detected free time channel and entering a busy signal in said time channel.

12. A telephone intercommunications system comprising
    a plurality of service terminals at least some of which are constituted by the telephone stations of the system;
    a pluraity of space-divided speech channels, the number of said speech channels being not greater than the number of said service terminals and said speech channels being maintained continuously operative,
    means for providing access selectively to all of said speech channels by each of said service terminals;
    a data highway, space-divided from the speech channels and coupled to said service terminals to be responsive to data therefrom which identifies calls to be made between service terminals, said data highway being operative in time division multiplex to provide a plurality of discrete data time channels for carrying said call identifying data, means associating each of said speech channels with one of said discrete data time channels at a respective time position, and means for selectively controlling said access providing means by the presence of call-identifying data in any one of said data time channels to provide access by the service terminals between which said calls are to be made to the selected one of said speech channels associated with said data time channel.

13. A system as claimed in claim 12, wherein said associating means includes counting means for counting the time channels in said data highway;

reading means for continuously reading data words which include the call identifying data in the channels;

means for recognising identity between at least part of a received data word and a data pattern stored at the station and individual thereto, and means for storing the content of the counting means in response to such identity.

* * * * *